Patented Mar. 28, 1939

2,152,473

UNITED STATES PATENT OFFICE 2,152,473

TREATMENT OF COMBUSTIBLE GASES

Roland Hall Griffith and Blick Crawley, London, England, assignors to The Gas Light & Coke Company, London, England, a British company No Drawing. Application June 18, 1937, Serial No. 148,953. In Great Britain May 13, 1936

7 Claims. (Cl. 23—3.1)

This application corresponds to the application of The Gas Light & Coke Company, Roland Hall Griffith and Blick Crawley, Serial No. 13586/36, which was filed in Great Britain on May 13, 1936.

This invention is for improvements in the treatment of combustible gases containing free hydrogen and has particular reference to the treatment of coal gas for the elimination therefrom of oxides of nitrogen.

We have found that if the traces of oxides of nitrogen present in coal gas are not removed they may give rise to trouble due to the deposition of gummy substances in gas burning or controlling appliances, and may cause similar difficulties in cases where the gas is to be compressed.

We have now found that the complete removal of oxides of nitrogen, including nitric oxide, may be brought about by bringing the gas into contact with catalytic agents obtained by the reduction of oxygen-containing compounds of metals such as the oxides, hydroxides, carbonates, salts of organic acids (e. g. acetates) or similar compounds. At the same time the diolefine hydrocarbons (which are responsible for gum formation) present in the gas are converted into saturated hydrocarbons.

The metals which have been found to possess catalytic activity in the present process are iron, cobalt or nickel.

The present invention accordingly comprises a process for the removal of free oxides of nitrogen from industrial combustible gases containing free hydrogen which process comprises bringing the said combustible gas into contact with a catalyst comprising a metal selected from the group consisting of iron, cobalt and nickel. The catalyst is prepared by reducing an oxide, hydroxide or carbonate or like oxygen-containing compound of iron, cobalt or nickel by heating in the presence of a reducing gas at a temperature of the order of 300–550° C. The reducing gas may consist of the industrial gas, e. g., coal gas, which is to be later treated for the elimination of free oxides of nitrogen therefrom.

It is desirable that the coal gas or other reducing gas employed in the preparation of the catalyst should be free from hydrogen sulphide, but the presence of other sulphur compounds in the gas does not reduce the activity of the catalyst.

The catalysts are conveniently employed in the form of pellets or granules made from a paste of finely ground oxide, hydroxide or carbonate of iron, cobalt or nickel or may be deposited as a hydroxide, oxide or carbonate on a rigid carrier or support such as china clay.

After treatment with the reducing gas, the catalyst is preferably allowed to cool out of contact with air.

The rate of removal of oxides of nitrogen depends on the inherent activitiy of the catalyst and on its temperature. It is desirable, for reasons of cheap operation, that the temperature should be as low as practicable and it has been found that temperatures between 20° and 200° C. may be used though in certain cases treatment at higher temperatures may be advisable.

In cases where a deep bed of catalyst is used the temperature may rise throughout the mass owing to the interaction of the oxygen contained in the coal gas with hydrogen. This rise in temperature need not be checked as it has no harmful effect on the catalyst.

When the gas to be treated is coal gas it may be passed through the catalyst at a rate, e. g., of about 1,000 or 2,000 volumes per hour per volume of catalyst space.

The effectiveness of the removal of oxides of nitrogen is practically independent of the original nitric oxide content of the gas, as far as the range usually encountered in purified coal gas is concerned. This is normally of the order of a few parts per million down to as little as one part in ten million.

The catalysts may be used in admixture with each other or with inert materials. It is important, however, that they should never be prepared from nitrates or from compounds containing nitrogen, nor should the carriers or supports contain any easily decomposable nitrogenous matter. If such nitrogenous substances are present the catalyst will increase the amount of nitric oxide in the gas.

Following are descriptions by way of example of methods of carrying the invention into effect:

Example I

A catalyst is prepared by grinding ferric oxide into a paste with distilled water, and forming the paste into small pellets which are dried and packed into a suitable catalyst tube. Coal gas is passed over the catalyst at 450° C. for one hour and the temperature is then lowered to 100° C. Coal gas can then be passed over the catalyst at this temperature at a rate of about 1,000 volumes per hour per volume of catalyst space, and with an inlet content of nitric oxide of 0.4 part per million the outlet figure was nil. The oxides of nitrogen are reduced to ammonia and any diolefine hydrocarbons present are converted to saturated hydrocarbons. The gas may then be treated for the removal of benzole therefrom by means of active carbon.

Example II

A nickel catalyst is prepared by depositing nickel hydroxide on a china clay carrier and reducing the hydroxide at 400° C. in coal gas. The catalyst is maintained at a temperature of 150° C. and coal gas passed over it at the rate of about 2,000 volumes of gas per hour per volume of catalyst space. The coal gas coming into contact with the catalyst contained oxides of nitrogen but the treated gas was found to contain no oxides of nitrogen. The gas is then cooled and may be passed over active charcoal for the removal of benzole.

Example III

Pellets prepared by baking a white china-clay were soaked in a strong solution of nickel chloride, which was then converted into the hydroxide by plunging into caustic soda. The product was washed free from soluble salts and reduced in coal gas at 350° C., during two hours, when it produced a very active and resistant catalyst. This was used to treat coal gas at about 1500–2000 cu. ft. per hour per cubic foot of catalyst space, the gas being preheated to about 150° C. When the inlet gas contained concentrations of nitric oxide up to about 2 parts per million, the outlet contained no detectable quantity.

We claim:

1. A catalytic process for the conversion to ammonia of free oxides of nitrogen in industrial combustible gases containing free hydrogen and organic compounds of sulphur but containing no hydrogen sulphide which process comprises passing the gas at a temperature between 100° and 200° C. into contact with a catalyst consisting of the product of reducing a compound selected from the group consisting of the non-nitrogenous oxygen-containing compounds of nickel and cobalt with a gaseous reducing agent containing an organic sulphur compound.

2. A catalytic process for the conversion to ammonia of free oxides of nitrogen in industrial combustible gases containing free hydrogen and organic compounds of sulphur but containing no hydrogen sulphide which process comprises passing the gas at a temperature between 100° and 200° C. into contact with a catalyst consisting of the product of reducing at a temperature between 300 and 550° C. with a gaseous reducing agent containing an organic sulphur compound, a compound selected from the non-nitrogenous oxygen-containing group consisting of oxides, hydroxides, carbonates or salts of organic acids of nickel or cobalt.

3. A catalytic process for the conversion to ammonia of free oxides of nitrogen in coal gas containing organic compounds of sulphur but containing no hydrogen sulphide which process comprises passing the said coal gas at a temperature between 100° and 200° C. into contact with a catalyst consisting of the product of reducing a compound selected from the group consisting of the non-nitrogenous oxygen-containing compounds of nickel and cobalt with a gaseous reducing agent containing an organic sulphur compound.

4. A catalytic process for the conversion to ammonia of free oxides of nitrogen in coal gas containing organic compounds of sulphur but containing no hydrogen sulphide which process comprises passing the said coal gas at a temperature between 100° and 200° C. into contact with a catalyst consisting of the product of reducing a compound selected from the group consisting of the non-nitrogenous oxygen-containing compounds of nickel and cobalt with a gaseous reducing agent containing an organic sulphur compound at a temperature between 300° and 550° C.

5. A catalytic process for the conversion to ammonia of free oxides of nitrogen in coal gas containing free hydrogen and organic compounds of sulphur but containing no hydrogen sulphide which process comprises passing the gas at a temperature between 100° and 200° C. into contact with a catalyst consisting of the product of reducing at a temperature between 300° and 550° C. a compound selected from the group consisting of the non-nitrogenous oxygen-containing compounds of nickel and cobalt with coal gas containing organic sulphur compounds but no hydrogen sulphide, the product of reduction being allowed to cool out of contact with air.

6. A catalytic process for the conversion to ammonia of free oxides of nitrogen in coal gas containing organic compounds of sulphur but containing no hydrogen sulphide which process comprises passing the coal gas at a temperature between 100° and 200° C. and at a rate of the order of 1,000 to 2,000 volumes per hour per volume of catalyst space into contact with a catalyst consisting of the product of reducing at a temperature between 300° and 550° C. a compound selected from the group consisting of the non-nitrogenous oxygen-containing compounds of nickel and cobalt with coal gas containing organic sulphur compounds but free from hydrogen sulphide.

7. A catalytic process for the conversion to ammonia of free oxides of nitrogen in industrial combustible gases containing free hydrogen and organic compounds of sulphur but containing no hydrogen sulphide which process comprises passing the gas at a temperature between 100° and 200° C. into contact with a catalyst consisting of the product of reducing at a temperature between 300° and 550° C. a compound selected from the group consisting of the non-nitrogenous oxygen-containing compounds of nickel and cobalt with a gaseous reducing agent containing organic sulphur compounds but free from hydrogen sulphide, the said compound being supported on an inert material free from readily decomposable nitrogenous matter.

ROLAND HALL GRIFFITH
BLICK CRAWLEY.